United States Patent [19]
Johnson

[11] Patent Number: 5,359,809
[45] Date of Patent: Nov. 1, 1994

[54] REUSABLE POT FOR RECEIVING A TREE ROOT BALL AND FACILITATING TRANSPORT, HANDLING AND PLANTING THEREOF

[76] Inventor: Floyd L. Johnson, Maywood Evergreen, 14595 Ostlund Trail, Marine on the St. Croix, Minn. 55047

[21] Appl. No.: 78,056

[22] Filed: Jun. 17, 1993

[51] Int. Cl.[5] .............................................. A01G 23/02
[52] U.S. Cl. ........................................... 47/73; 47/76; 220/4.34; 220/4.24
[58] Field of Search .................. 47/66, 73, 76; 220/4.06, 4.07, 4.08, 4.29, 4.32, 4.34, 4.21, 4.22, 4.24

[56] References Cited

U.S. PATENT DOCUMENTS

| | | | |
|---|---|---|---|
| D. 226,279 | 2/1973 | Eyerly | 47/73 |
| 1,031,713 | 7/1912 | Hills | 47/73 |
| 1,039,058 | 9/1912 | Hoeffel | 220/4.07 |
| 1,776,375 | 9/1930 | Russell | 47/73 |
| 3,471,192 | 10/1969 | Childs | 47/73 |
| 4,625,662 | 12/1986 | Heinzen | 111/2 |
| 4,628,634 | 12/1986 | Anderson | 47/73 |

FOREIGN PATENT DOCUMENTS

| | | | |
|---|---|---|---|
| 159003 | 9/1954 | Australia | 47/73 |
| 1061564 | 4/1979 | Canada | 47/76 |
| 2491033 | 4/1982 | France | 47/73 |
| 38332 | 5/1886 | Germany | 220/4.29 |
| 86002 | 8/1895 | Germany | 220/4.29 |
| 305222 | 1/1930 | United Kingdom | 47/73 |

Primary Examiner—Henry E. Raduazo
Attorney, Agent, or Firm—David George Johnson

[57] ABSTRACT

The present invention is a reusable nursery stock container (1) which is designed to receive the root ball directly from the tree diging machine (2) which may be disassembled at the time a plant (3) is transplanted so as to substantially reduce damage to the root ball of the plant. The container(1) is formed of detachable container halves(9,8) which are securely attached to each other to form an integrated container by means of flanges. A bottom member(19) is secured to a bottom region of the container by a shelf(14) which is spaced above the bottom edge of container and held in place by means of tabs (25). The side walls may be tapered to facilitate vertical stacking, and molded in handles(6,7) are formed near an upper region of the container so as to facilitate handling.

6 Claims, 5 Drawing Sheets

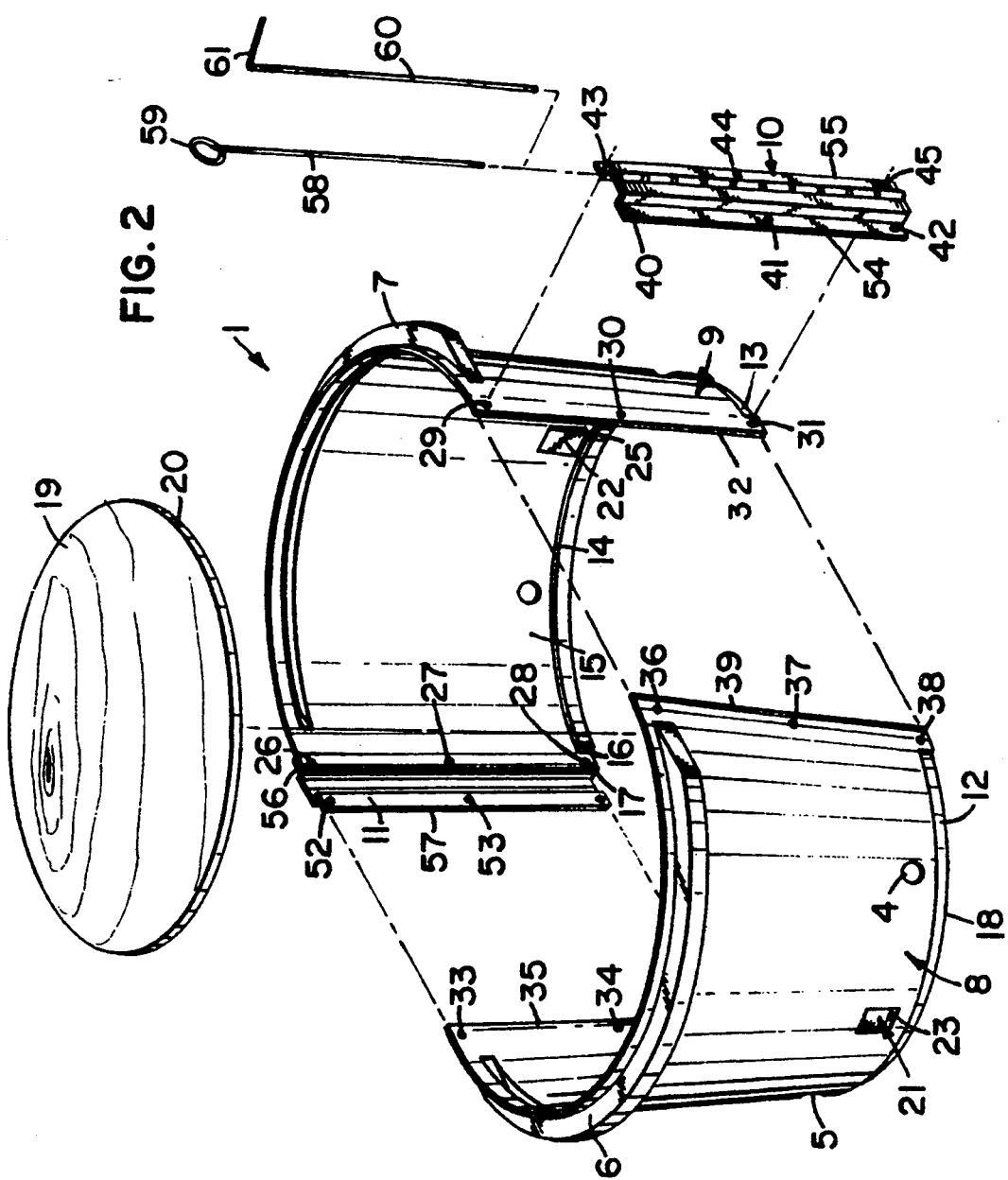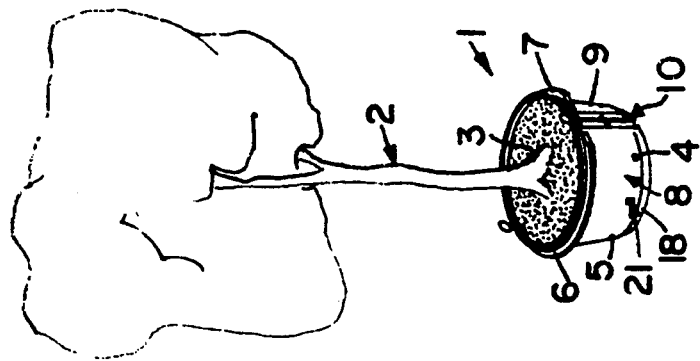

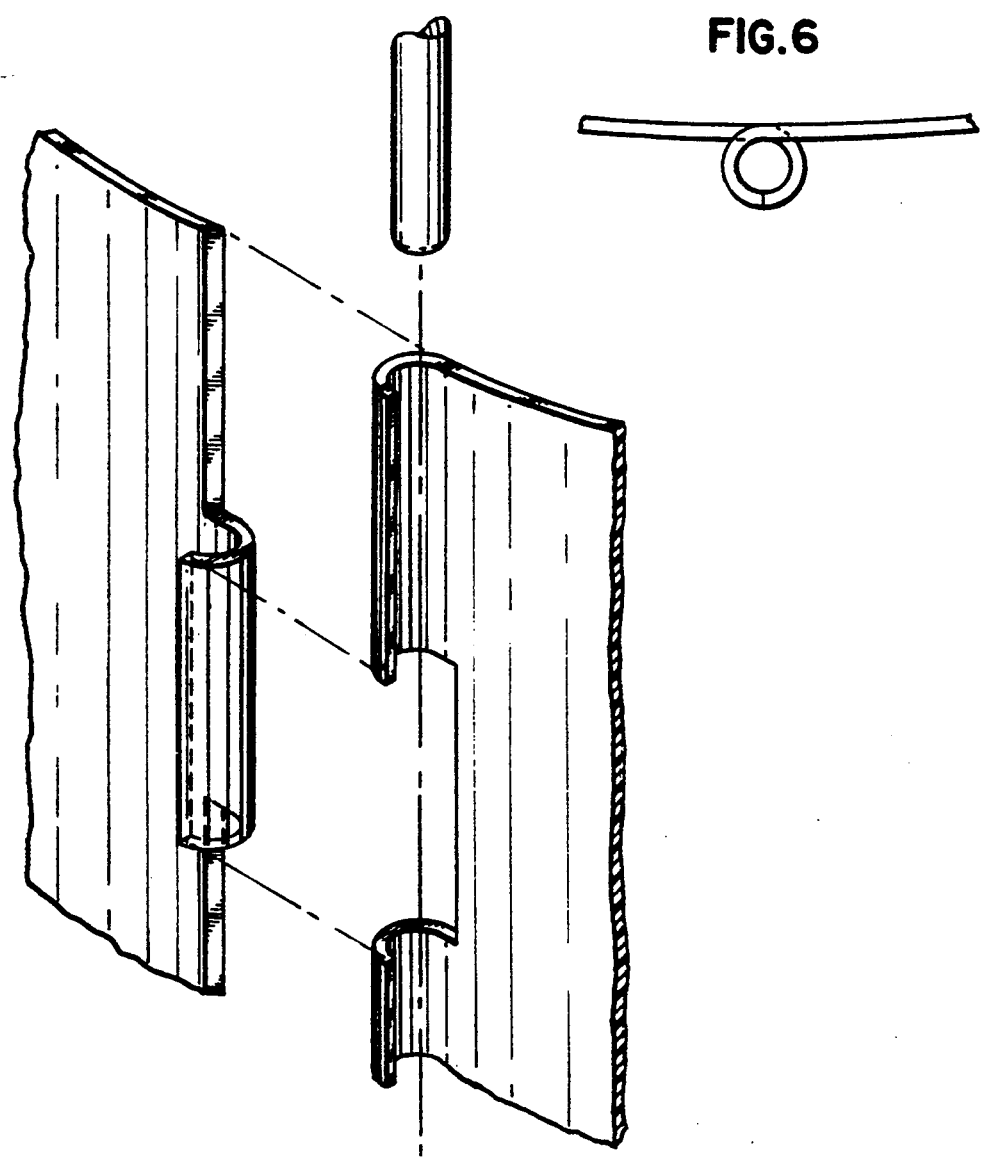
FIG. 5
FIG. 6
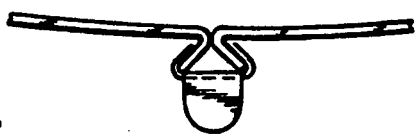
FIG. 7
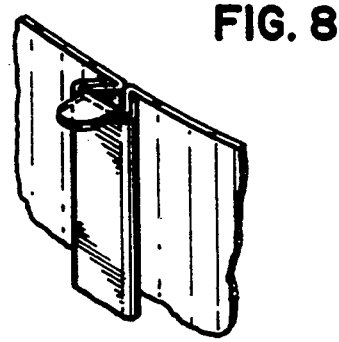
FIG. 8

REUSABLE POT FOR RECEIVING A TREE ROOT BALL AND FACILITATING TRANSPORT, HANDLING AND PLANTING THEREOF

FIELD OF THE INVENTION

The present invention relates to a nursery stock container and more particularly to a reusable container which will receive a root ball and which may be disassembled without causing damage to the root ball, after which the container can be reassembled to receive another root ball.

BACKGROUND OF THE INVENTION

In transplanting larger plants, such as trees, it is important to excavate most of the roots along with the earth in which the roots reside. Plants that are transplanted with the least damage to their rootlets and root hairs have the best chance of surviving in a new location, all other things being equal. A plant is desirably moved along with a "root ball," that has most of its root still embedded in the earth in which the plant was growing. This allows the roots and the root ball to continue to nourish the plant after it is transplanted until new root growth can take place.

Any relative movement between the earth and the roots in the root ball, however, tends to break or damage the rootlets or tiny root hairs. Therefore, it is important for a transplanting apparatus to preserve a root ball and the supporting soil with a minimum of disturbance to the earth and root therein.

In particular, when transplanting trees, it is necessary to provide a container for the soil, which forms in combination with the roots of the plant, the root ball. It is during the digging and planting phase of the process that care must be taken to prevent damage to the root ball which might kill or stunt the growth of the plant. Separating the plant from the stock container or during the above-mentioned transfer operations is generally when damage to the root ball occurs, and it is these reoccurring problems to which the present invention is directed.

A common method of transplanting trees is to use a wire basket and burlap bag, which is wrapped around the root ball and secured with twine to the trunk of the tree. This traditional system is actually most unsuitable because the root ball may be easily damaged through normal handling and transportation, often in the back of a flatbed or pickup truck, wherein normal road vibration causes much of the soil to separate from the roots themselves. In any event, during the transplanting operation, the wire basket and burlap bag provide limited structural integrity to the root ball.

Thus, the ideal solution is to provide a transplanting pot or root ball containment vessel which would conveniently receive the root ball and be safely and easily removed from the root ball. Nursery stock containers which may be disassembled at the transplanting site are well known in the art. However, many such containers have either not adequately simplified the root balling procedure or eliminated the chances that damage will occur to the root ball while receiving the root ball or during the disassembly process or the transfer process.

Lightweight containers made from materials such as pressed fiberboard or paper are generally not reusable. Such containers are also not sufficiently durable to withstand the rigors of the nursery setting where stock is transferred about and finally shipped to the transplanting destination. This is particularly true with heavier plants which may weigh 250 pounds. Additionally, the root ball may be of a size which requires a container with a capacity in excess of three gallons. Further, if such a container is left to surround the root ball after transplanting in the ground, the growth of the plant is necessarily retarded until the fibers of the container material deteriorate to the degree necessary to allow the roots to be freed from the ball and extend into the surrounding soil.

Finally, manufacturers of containers constructed of flexible materials, such as plastic, have struggled with the problem of creating a lightweight, resilient container, which also has the structural integrity and simplicity to be used in the field both during the root balling process, handling of the container and the transplanting of the tree. In order to accommodate the structural requirements of the tree containment vessel, prior art devices have required the excavation of an abnormally large crater in the ground, and have required an unusual amount of dexterity and/or the presence of hand tools in order to disassemble the container once the tree is placed in its final transplanted location.

SUMMARY OF THE INVENTION

The present invention relates to a reusable, stackable and recyclable split container for use in planting trees and shrubs. The present invention permits "potting" of a plant in association with conventional tree diggers, and also permits "depotting" of the plant at the transplantation site. The present invention utilizes tapered side walls which facilitate vertical stacking, simplified root balling, ease of mechanical handling, hauling of the tree while in a substantially vertical position and removal of the root ball during the transplanting operation.

A novel handle arrangement permits ease of handling and lifting of the container, as well as affixing a covering to the top of the container.

A simplified bottom plate is securely mounted within the container but does not interfere with the disassembly of the container once transplanting is complete. The bottom plate may be formed of a simple shape and of a biodegradable material so that it may be left in the ground once transplanting is complete.

The container includes plastic flanges which are secured on both sides thereby permitting complete disassembly of the container. The flanges are secured by zinc coated metal strips on each side which are fastened together by suitably coated bolts.

Furthermore, the containers of the present invention are preferably formed rigidly as compared to known containers to aid in their reuse. The preferred manufacturing process involves vacuum molding or injection molding of the container.

BRIEF DESCRIPTION OF THE DRAWINGS

FIG. 1 is a perspective view illustrating a container constructed according to the principles of the present invention, housing a tree and associated soil;

FIG. 2 is an exploded perspective view illustrating the container as shown in FIG. 1;

FIG. 5 is a perspective view of the first embodiment of a mechanism used to secure the container halves together;

FIG. 6 is a plan view of the embodiment depicted in FIG. 5;

FIG. 7 is a plan view of a second embodiment of a mechanism used to secure the container halves together;

FIG. 8 is a perspective view of the embodiment depicted in FIG. 7;

DETAILED DESCRIPTION OF THE INVENTION

Figure 3:
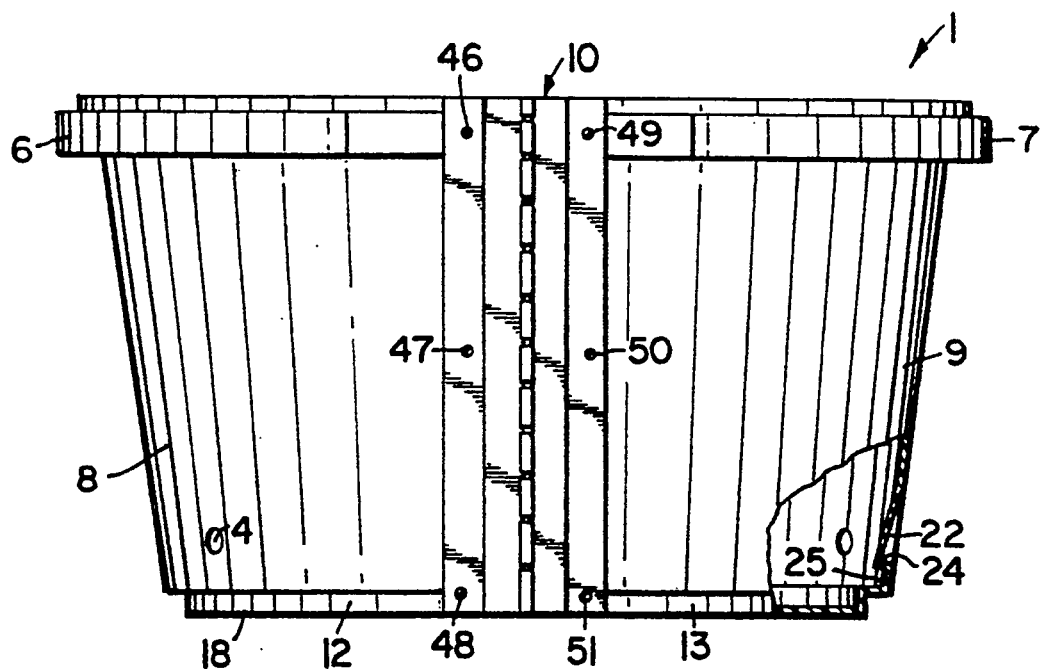
FIG. 3 is an elevation of a container as illustrated in FIG. 1, with a portion broken away to reveal details of the interior.

In the Drawings like reference numerals are used throughout the several views to indicate the same or like elements of the invention. Referring to FIG. 1, a first embodiment of the invention is shown as it would typically appear in use in a plant nursery. The invention is assembled as the container 1 in which resides a plant 2 including roots (not shown) embedded in soil 3. The plant 2 may reside in container 1 for a considerable period of time, undergoing some growth during that period, but eventually requiring transplanting to a permanent location. There it may be placed in the ground so as to reach full maturity. However, to facilitate watering during this storage phase, drainage holes 4 and 5 are included near the base of container 1. To facilitate handling of the container, both during the storage and the transplanting operation, a pair of molded in handles 6 and 7 is included in an upper region of the container 1.

Figure 13:
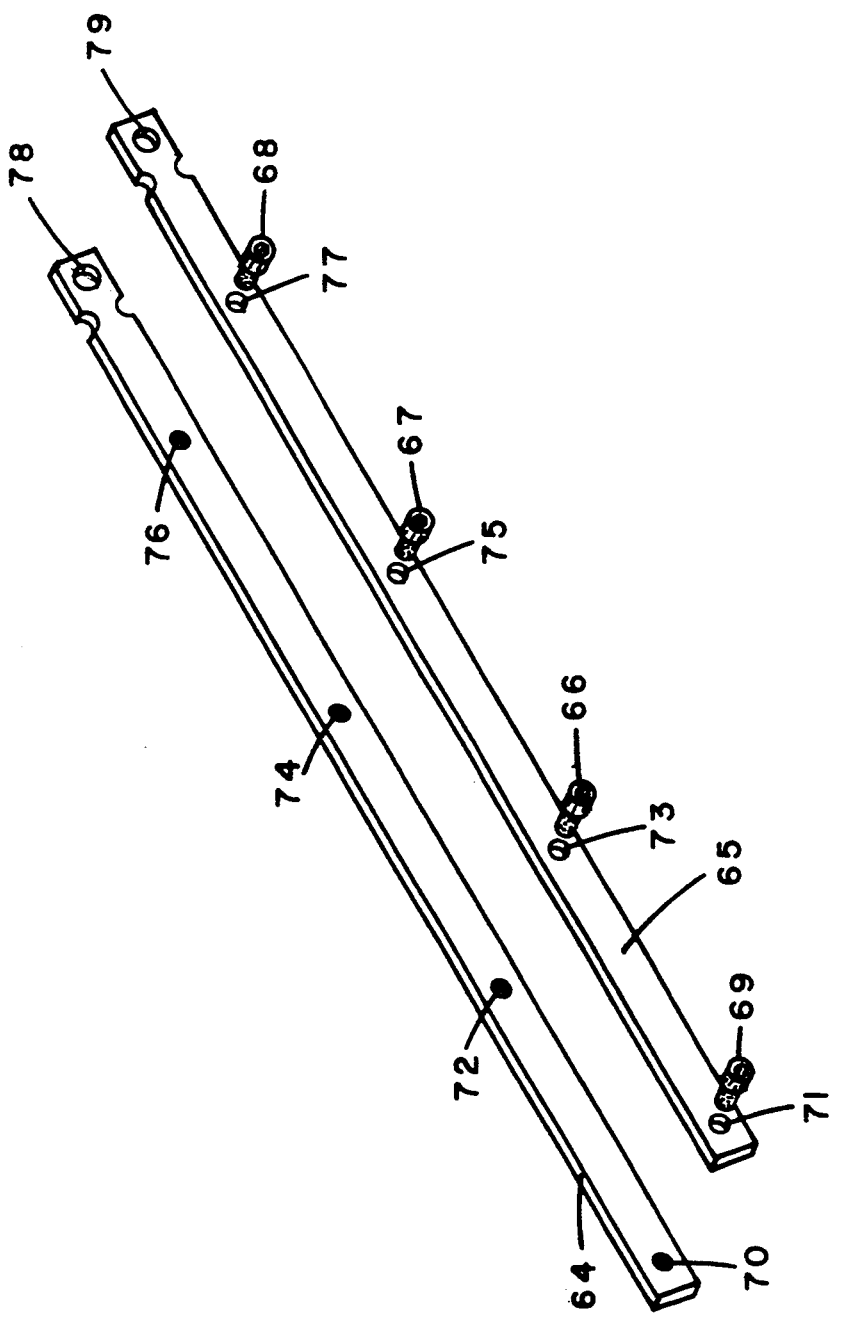
FIG. 13 is a perspective view of a fifth embodiment of a mechanism used to secure the container halves together.

The container is formed as two halves 8 and 9 which are joined securely to each other by hinges 10 and 11. As may be seen in FIGS. 5 through 13, the hinge or securing mechanism may take a variety of forms. In FIG. 13, for example, a first metal strip 64 and a second metal strip 65 are secured to a respective integrally formed flange (not shown) on each of the respective halves 8 and 9 by a series of cap screws 66, 67, 68 and 69 which pass through mating orifices 70,71,72,73,74,75,76 and 77. An additional pair of orifices 78 and 79 are located near the top of strips 64 and 65, respectively, to permit the use of a "hay hook" to grasp the container and permit its transport by hand.

Referring now to FIG. 2, the various parts and their arrangement as part of container 1 may be more readily appreciated. The lower region of container half 8 contains an indented peripheral region 12. Similarly, container half 9 has formed near its base region an indented peripheral region 13, which can be seen to form a ridge or shelf 14 near the base of the interior wall 15 of container half 9. Although the end 16 of shelf 14 ends somewhat before the edge 17 of container half 9, one can readily visualize that when container halves 8 and 9 are joined together by hinges 10 and 11, or metal strips 64 and 65, the indentations 12 and 13 form a substantially continuous ridge or support slightly above the actual bottom edge 18 of container 1.

This interior ridge is used to support bottom member 19 which is formed to have a substantially circular plan form, and in a preferred embodiment, has a thickness of approximately ⅛ inch to ⅝ inch. Preferably, bottom member 19 is formed of a biodegradable material such as plywood, paper, or the like. The other main requirement of bottom member 19 is that it have the structural integrity to maintain its shape and withstand the weight of plant 1 and associated soil 3, including the stresses placed on bottom member 19 during transport of the completed plant/container assembly.

The diameter of bottom member 19 is chosen to be slightly less than the inside diameter of container 1 near its bottom region, but large enough so that it may be supported substantially continuously along its perimeter 20. Also note that the height of indented regions 12 and 13 form a space, preferably between ¼ inch and ¾ inch in height, between the bottom edge 18 of container 1 and the lower portion of bottom member 19, thereby preventing the actual bottom member 19 from being affected by the presence of moisture which may be on the surface upon which container 1 resides.

In order to ensure that bottom member 19 is secured to shelf 14 when container 1 is tipped or tilted, or when the bottom of bottom member 19 is pressed from beneath by some irregularity of the surface upon which container 1 resides, a pair of flexible retaining tabs 21 and 22 are formed within container halves 8 and 9 respectively. Ideally, container halves 8 and 9 are each formed of a resilient, deformable plastic or other similar material, such that the scoring, molding or deformation of a small region of the sides 8 and 9 may be used to form the resilient tabs 21 and 22 as shown. In one embodiment, the tabs 21 and 22 are biased to protrude inwardly from the sides of halves 8 and 9.

A small shelf 23, 24, may also be formed within container halves 8 and 9 respectively, so as to provide a support or positive detent for tabs 21 and 22. One may appreciate that the tabs 21 and 22 may be completely rigid in an alternative embodiment, insofar as bottom member 19 may be easily inserted within the space 25, for example, between ridge 14 and tab 22 when the container halves 8 and 9 are separated. Thus, the bottom member 19 may be easily inserted within space 25 prior to assembly of container halves 8 and 9, and after transplanting is complete, bottom member 19 may be easily dislodged from halves 8 and 9 merely by separation of the halves 8 and 9 during the disassembly process.

Referring to FIGS. 2 and 3, the means of attachment of halves 8 and 9 to form a single integrated container 1 may be appreciated. A series of perforations 26, 27, and 28 are formed substantially adjacent to edge 17 of container half 9, while perforations 29, 30, and 31 are formed substantially adjacent to edge 32 of container half 9.

Similarly, a series of perforations 33 and 34, for example, are formed substantially adjacent to edge 35 of container half 8, while another series of perforations 36, 37 and 38 are formed adjacent to edge 39 of container half 8.

When edges 17 and 35 are placed into an abutting relationship with each other, as well as the placement of edge 39 and edge 32 into an abutting relationship, a unified container is formed. The placement of bottom member 19 along shelf 14, secured by tabs 21 and 22, forms a container having a bottom member which may then be readily secured to form a unified structure. In a preferred embodiment hinge member 10 is formed so as to be of substantially the same height as the height of container halves 8 and 9 and is formed so as to have a series of perforations 40, 41, 42, 43, 44, and 45 which align with holes 36, 37, 38, 29, 30, and 31 respectively. The hinge may be permanently or semi-permanently attached to container halves 8 and 9 by means of rivets or screws 46, 47, 48, 49, 50 and 51. Similarly, hinge 11 is formed so as to have a series of mounting holes which align with orifices 26, 27 and 28 of container half 9, and a series of mounting holes 52 and 53, for example, which align with orifices 33 and 34 in container half 8. Hinge 11 may also be attached either permanently or semi-permanently to container halves 8 and 9 by means of either rivets, screws or other suitable shafted fasteners.

As is typical of a hinge structure, hinge member 10 is actually formed of separate hinge halves 54 and 55, while hinge 11 is actually formed of two discrete hinge halves 56 and 57. Such hinge members are held together to form a single integrated hinge structure by means of a shaft or pin. For example, hinge halves 54 and 55 form hinge 10 when connected together by pin 58, which is formed with a ring 59 at an upper region to provide ease of gripping and to prevent over-extension of member 58 into the hinge 10. In an alternative embodiment, a pin 60 having a bent upper region 61 which serves as a handle may also be used, an advantage being that handle 61 may be rotated so as to be aligned with the side walls of container 1.

Figure 4:
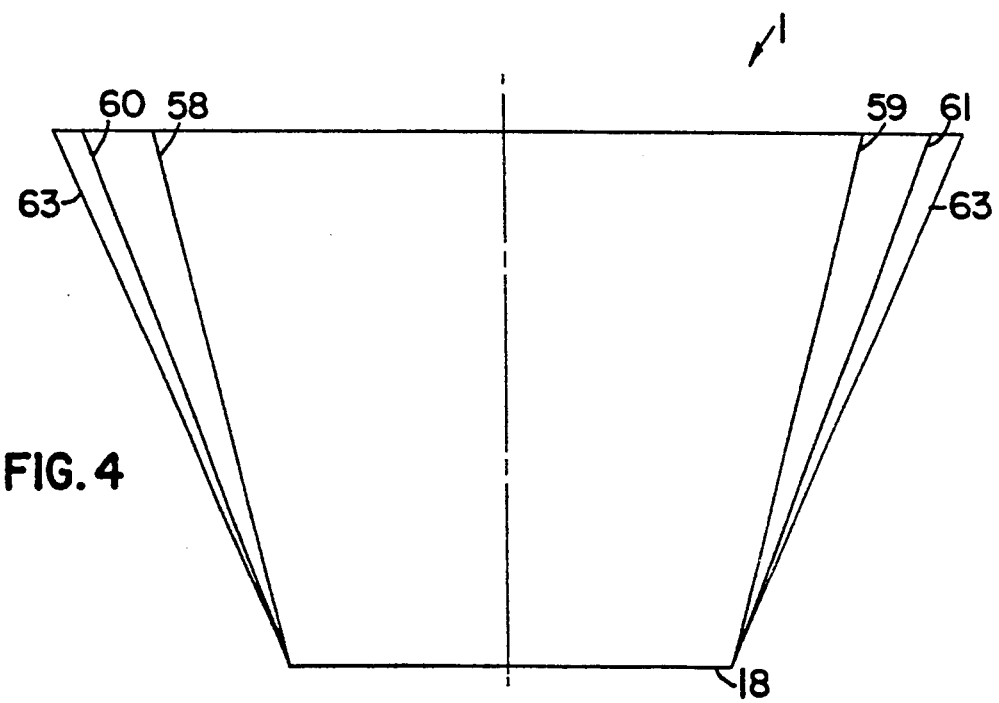
FIG. 4 is a schematic elevation showing the tapering of the walls of various embodiments of the present invention.
Figure 9:
FIG. 9 is a plan view of a third embodiment of a mechanism used to secure the container halves together.
Figure 10:
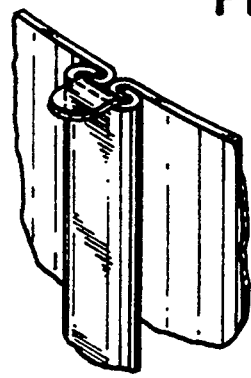
FIG. 10 is a perspective view of the embodiment of FIG. 10.
Figure 11:
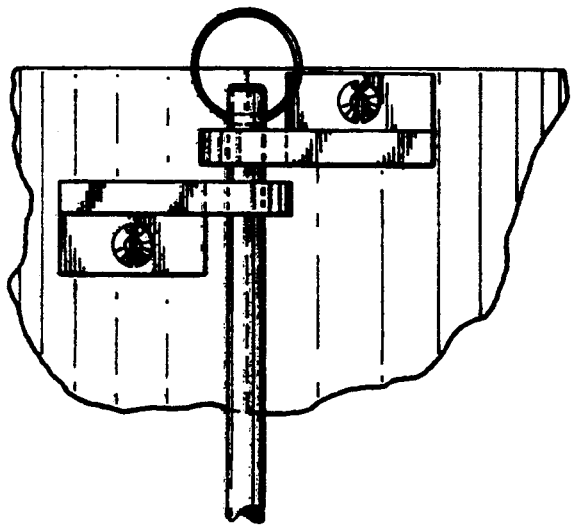
FIG. 11 is a front elevation of a fourth embodiment of a mechanism used to secure the container halves together.
Figure 12:
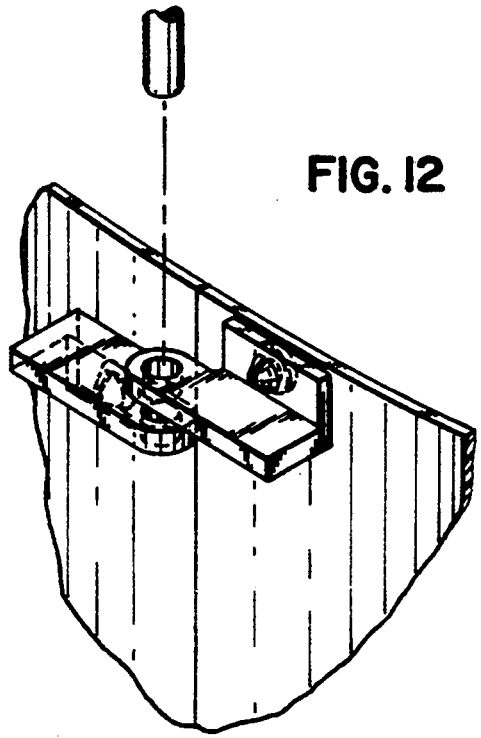
FIG. 12 is a perspective view of the embodiment depicted in FIG. 11.

Referring now to FIG. 4, a schematic representation of the container 1 may be seen. To promote ease of vertical stacking during storage of the containers, as well as removal of the root ball from the tree digger to confinement within the container, if necessary, due to variations in the angle of the root ball formed by various tree diggers, the side walls may be built so as to form a different angle of taper with respect to the bottom edge 18. For example, side walls 58 and 59 are shown with a taper of approximately 15°. In an alternative embodiment, side walls 60 and 61 may be tapered at 22°, and in a third embodiment, suitable for particularly adhesive, clay-type soils, side walls 62 and 63 may be formed so as to have a taper of 25°. Various other angles of taper may also be used to be compatible with the particular tree digger used to form the root ball.

Of course, modifications of the various parts of the invention in keeping with the teachings set forth above would be possible to those skilled in the art. Thus, the invention is believed limited only by the scope of the claims which follow.

I claim:

1. A containment vessel for plants and soil, comprising:
   a) a first half, the first half having a lower region and an upper region;
   b) a second half, the second half having a lower region and an upper region;
   c) a first hinge;
   d) a second hinge, the first and second hinges being formed as a plurality of metal strips, each metal strip being affixed to one of the halves, the metal strips being adapted to be hingedly affixed to an adjacent metal strip, thereby forming a containment vessel having a substantially continuous perimeter surface;
   e) a bottom member, the bottom member being supported near a lower region of the first half and the second half;
   f) a ridge portion, the ridge portion being integrally formed as a part of the lower region of the first half and the second half, the bottom member residing upon the ridge portion;
   g) a first tab integrally formed within the lower region of the first half; and
   h) a second tab integrally formed within the lower region of the second half, the first and second tabs being spaced apart from the ridge portion so as to create a region within which a perimeter portion of the bottom member resides, wherein the first and second tabs are resiliently deformable such that each tab may be deflected so as to be substantially continuous with an adjacent surface contour of the first half and the second half, respectively.

2. The containment vessel of claim 1, wherein each of the first and second tabs is spaced apart from the ridge at a distance such that the bottom member is securely gripped between i) the first tab and the ridge and ii) the second tab and the ridge.

3. The containment vessel of claim 2, wherein the upper region of the first half and the second half are each formed so as to include a handle member.

4. The containment vessel of claim 3, wherein each handle member is substantially parallel to the bottom member.

5. The containment vessel of claim 4, further comprising a plurality of drainage holes passing through the lower region of the first half and the second half.

6. The containment vessel of claim 5, wherein the bottom member is made of a biodegradable material.

* * * * *